United States Patent
Douceur et al.

(10) Patent No.: US 7,886,364 B2
(45) Date of Patent: *Feb. 8, 2011

(54) ENCRYPTED KEY CACHE

(75) Inventors: John R. Douceur, Bellevue, WA (US);
Atul Adya, Redmond, WA (US);
William J. Bolosky, Issaquah, WA (US);
Marvin M. Theimer, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1114 days.

This patent is subject to a terminal disclaimer.

(21) Appl. No.: 11/206,556

(22) Filed: Aug. 18, 2005

(65) Prior Publication Data

US 2006/0026425 A1    Feb. 2, 2006

Related U.S. Application Data

(63) Continuation of application No. 09/817,812, filed on Mar. 26, 2001, now Pat. No. 6,981,138.

(51) Int. Cl.
*H04L 9/00*     (2006.01)
*H04K 1/00*     (2006.01)
*H04N 7/173*    (2006.01)
*G06F 11/30*    (2006.01)
*H04L 9/08*     (2006.01)
*H04L 9/30*     (2006.01)
*G06F 12/14*    (2006.01)
*G06F 21/00*    (2006.01)

(52) U.S. Cl. .................. 726/28; 725/32; 713/194; 380/273; 380/277

(58) Field of Classification Search ............. 726/28; 713/194; 380/273, 277; 725/32
See application file for complete search history.

(56) References Cited

U.S. PATENT DOCUMENTS 4,979,188 A   12/1990   Kotzin et al.

(Continued)

FOREIGN PATENT DOCUMENTS

EP    0663640    7/1995

(Continued)

OTHER PUBLICATIONS

Weidong Shi, Hsien-Hsin S. Lee, "Accelerating memory decryption and authentication with frequent value prediction", May 2007, CF '07: Proceedings of the 4th international conference on Computing frontiers, Publisher: ACM, pp. 35-45.*

(Continued)

*Primary Examiner*—Michael Pyzocha
*Assistant Examiner*—Courtney D Fields
(74) *Attorney, Agent, or Firm*—Lee & Hayes, PLLC

(57) ABSTRACT

A file that has been encrypted using a symmetric key and that has a corresponding access control entry with the symmetric key encrypted using the public key of a public/private key pair can be accessed. An encrypted key cache is also accessed to determine whether an access control entry to symmetric key mapping exists in the cache for the access control entry corresponding to the file. If such a mapping exists in the cache, then the mapped-to symmetric key is obtained form the cache, otherwise the encrypted symmetric key is decrypted using the private key of the public/private key pair. The encrypted key cache itself can also be encrypted and stored as an encrypted file.

20 Claims, 7 Drawing Sheets

U.S. PATENT DOCUMENTS

| | | |
|---|---|---|
| 5,202,982 A | 4/1993 | Gramlich et al. |
| 5,285,497 A | 2/1994 | Thatcher, Jr. |
| 5,317,728 A | 5/1994 | Tevis et al. |
| 5,371,794 A | 12/1994 | Diffie et al. |
| 5,452,447 A | 9/1995 | Nelson et al. |
| 5,483,652 A | 1/1996 | Sudama et al. |
| 5,553,235 A | 9/1996 | Chen et al. |
| 5,564,037 A | 10/1996 | Lam |
| 5,586,330 A | 12/1996 | Knudsen et al. |
| 5,588,147 A | 12/1996 | Neeman et al. |
| 5,627,996 A | 5/1997 | Bauer |
| 5,680,611 A | 10/1997 | Rail et al. |
| 5,692,178 A | 11/1997 | Shaughnessy |
| 5,740,361 A | 4/1998 | Brown |
| 5,745,902 A | 4/1998 | Miller et al. |
| 5,758,359 A | 5/1998 | Saxon |
| 5,778,395 A | 7/1998 | Whiting et al. |
| 5,794,042 A | 8/1998 | Terada et al. |
| 5,812,776 A | 9/1998 | Gifford |
| 5,873,085 A | 2/1999 | Enoki et al. |
| 5,901,227 A | 5/1999 | Perlman |
| 5,907,673 A | 5/1999 | Hirayama et al. |
| 5,909,540 A | 6/1999 | Carter et al. |
| 5,913,217 A | 6/1999 | Alger et al. |
| 5,915,096 A | 6/1999 | Rosenzweig et al. |
| 5,940,841 A | 8/1999 | Schmuck et al. |
| 5,950,198 A | 9/1999 | Falls et al. |
| 5,950,209 A | 9/1999 | Carrier, III et al. |
| 5,953,729 A | 9/1999 | Cabrera et al. |
| 5,960,446 A | 9/1999 | Schmuck et al. |
| 5,963,963 A | 10/1999 | Schmuck et al. |
| 5,968,121 A | 10/1999 | Logan et al. |
| 5,974,141 A | 10/1999 | Saito |
| 5,978,805 A | 11/1999 | Carson |
| 5,987,477 A | 11/1999 | Schmuck et al. |
| 5,991,414 A | 11/1999 | Garay et al. |
| 5,991,771 A | 11/1999 | Falls et al. |
| 6,023,506 A | 2/2000 | Ote et al. |
| 6,026,474 A | 2/2000 | Carter et al. |
| 6,029,168 A | 2/2000 | Frey |
| 6,032,151 A | 2/2000 | Arnold et al. |
| 6,032,216 A | 2/2000 | Schmuck et al. |
| 6,047,283 A | 4/2000 | Braun |
| 6,067,545 A | 5/2000 | Wolff |
| 6,098,079 A | 8/2000 | Howard |
| 6,122,378 A | 9/2000 | Yoshiura et al. |
| 6,122,631 A | 9/2000 | Berbec et al. |
| 6,125,372 A | 9/2000 | White |
| 6,137,885 A | 10/2000 | Totaro et al. |
| 6,145,094 A | 11/2000 | Shirriff et al. |
| 6,160,552 A | 12/2000 | Wilsher et al. |
| 6,167,449 A | 12/2000 | Arnold et al. |
| 6,173,293 B1 | 1/2001 | Thekkath et al. |
| 6,185,304 B1 | 2/2001 | Coppersmith et al. |
| 6,185,569 B1 | 2/2001 | East et al. |
| 6,185,574 B1 | 2/2001 | Howard et al. |
| 6,208,659 B1 | 3/2001 | Govindarajan et al. |
| 6,233,606 B1 | 5/2001 | Dujari |
| 6,240,416 B1 | 5/2001 | Immon et al. |
| 6,259,723 B1 | 7/2001 | Miyashita |
| 6,260,040 B1 | 7/2001 | Kauffman et al. |
| 6,263,348 B1 | 7/2001 | Kathrow et al. |
| 6,269,080 B1 | 7/2001 | Kumar |
| 6,295,538 B1 | 9/2001 | Cooper et al. |
| 6,311,165 B1 | 10/2001 | Coutts et al. |
| 6,324,544 B1 | 11/2001 | Alam et al. |
| 6,338,057 B1 | 1/2002 | Weeks |
| 6,345,288 B1 | 2/2002 | Reed et al. |
| 6,370,547 B1 | 4/2002 | Eftink |
| 6,389,433 B1 | 5/2002 | Bolosky et al. |
| 6,405,315 B1 | 6/2002 | Burns et al. |
| 6,415,280 B1 | 7/2002 | Farber et al. |
| 6,415,372 B1 | 7/2002 | Zakai et al. |
| 6,463,535 B1 | 10/2002 | Drews |
| 6,466,978 B1 | 10/2002 | Mukherjee et al. |
| 6,477,544 B1 | 11/2002 | Bolosky et al. |
| 6,484,186 B1 | 11/2002 | Rungta |
| 6,484,204 B1 | 11/2002 | Rabinovich |
| 6,493,804 B1 | 12/2002 | Soltis et al. |
| 6,510,426 B1 | 1/2003 | Cohen et al. |
| 6,516,350 B1 | 2/2003 | Lumelsky et al. |
| 6,522,423 B2 | 2/2003 | Cohen et al. |
| 6,535,894 B1 | 3/2003 | Schmidt et al. |
| 6,556,998 B1 | 4/2003 | Mukherjee et al. |
| 6,560,706 B1 | 5/2003 | Carbajal et al. |
| 6,577,734 B1 * | 6/2003 | Etzel et al. ................ 380/277 |
| 6,671,821 B1 | 12/2003 | Castro et al. |
| 6,704,730 B2 | 3/2004 | Moulton et al. |
| 6,711,559 B1 | 3/2004 | Kogota et al. |
| 6,718,360 B1 | 4/2004 | Jones et al. |
| 6,721,880 B1 | 4/2004 | Pike |
| 6,725,373 B2 | 4/2004 | Carbajal et al. |
| 6,738,797 B1 | 5/2004 | Martin |
| 6,742,114 B1 | 5/2004 | Carter et al. |
| 6,748,538 B1 | 6/2004 | Chan et al. |
| 6,751,627 B2 | 6/2004 | Sternin |
| 6,766,367 B1 | 7/2004 | Stevenson et al. |
| 6,775,703 B1 | 8/2004 | Burns et al. |
| 6,788,769 B1 | 9/2004 | Waites |
| 6,928,426 B2 | 8/2005 | Dake |
| 6,947,556 B1 | 9/2005 | Matyas, Jr. et al. |
| 6,952,737 B1 | 10/2005 | Coates et al. |
| 6,988,124 B2 | 1/2006 | Douceur et al. |
| 6,990,578 B1 | 1/2006 | O'Brien et al. |
| 6,993,653 B1 | 1/2006 | Guski et al. |
| 6,996,714 B1 | 2/2006 | Halasz et al. |
| 7,000,141 B1 | 2/2006 | Karlsson et al. |
| 7,010,689 B1 | 3/2006 | Matyas, Jr. et al. |
| 7,043,637 B2 | 5/2006 | Bolosky et al. |
| 7,051,028 B2 | 5/2006 | Shi et al. |
| 7,092,380 B1 | 8/2006 | Chen et al. |
| 7,146,377 B2 | 12/2006 | Nowicki et al. |
| 7,152,165 B1 | 12/2006 | Maheshwari et al. |
| 7,249,382 B2 | 7/2007 | Kawell, Jr. et al. |
| 7,272,630 B2 | 9/2007 | Douceur et al. |
| 7,296,039 B2 | 11/2007 | Chandrasekaran et al. |
| 2001/0039548 A1 | 11/2001 | Shinkai et al. |
| 2002/0016174 A1 | 2/2002 | Gibson et al. |
| 2002/0038296 A1 | 3/2002 | Margolus et al. |
| 2002/0066022 A1 | 5/2002 | Calder et al. |
| 2002/0073082 A1 | 6/2002 | Duvillier |
| 2002/0088011 A1 | 7/2002 | Lamkin et al. |
| 2002/0095590 A1 | 7/2002 | Douceur et al. |
| 2002/0095674 A1 * | 7/2002 | Lowthert et al. ............ 725/32 |
| 2002/0097878 A1 | 7/2002 | Ito et al. |
| 2002/0099784 A1 | 7/2002 | Tran |
| 2002/0103818 A1 | 8/2002 | Amberden |
| 2002/0111996 A1 | 8/2002 | Jones et al. |
| 2002/0120839 A1 | 8/2002 | Hein, III |
| 2003/0028519 A1 | 2/2003 | Burgess |
| 2003/0046533 A1 | 3/2003 | Olkin et al. |
| 2003/0070071 A1 | 4/2003 | Riedel et al. |
| 2003/0088515 A1 | 5/2003 | Cooper et al. |
| 2003/0135586 A1 | 7/2003 | Minborg |
| 2004/0068652 A1 | 4/2004 | Carpentier |
| 2004/0078596 A1 | 4/2004 | Kent, Jr. et al. |
| 2004/0111608 A1 | 6/2004 | Oom Temudo de Castro et al. |
| 2004/0143743 A1 | 7/2004 | Margolus et al. |
| 2004/0143744 A1 | 7/2004 | Margolus et al. |
| 2004/0162808 A1 | 8/2004 | Margolus et al. |
| 2004/0249902 A1 | 12/2004 | Tadayon et al. |
| 2005/0071315 A1 | 3/2005 | Douceur et al. |
| 2005/0071330 A1 | 3/2005 | Douceur et al. |
| 2005/0071339 A1 | 3/2005 | Douceur et al. |

| | | | |
|---|---|---|---|
| 2005/0071340 A1 | 3/2005 | Douceur et al. | |
| 2005/0131903 A1 | 6/2005 | Margolus et al. | |
| 2005/0131961 A1 | 6/2005 | Margolus et al. | |
| 2005/0172124 A1 | 8/2005 | Carpentier et al. | |
| 2005/0222994 A1 | 10/2005 | Douceur et al. | |
| 2005/0246393 A1 | 11/2005 | Coates et al. | |
| 2006/0129807 A1 | 6/2006 | Halasz et al. | |
| 2006/0251246 A1 | 11/2006 | Matsui | |

FOREIGN PATENT DOCUMENTS

| | | | |
|---|---|---|---|
| EP | 0774715 A1 | 5/1997 | |
| EP | 1052805 | 11/2000 | |
| WO | WO 2009034320 A1 | * | 3/2009 |

OTHER PUBLICATIONS

Rivest, "Unconditionally Secure Authentication", Lecture 3, Sep. 11, 1997, pp. 1-4.
"Survivable Information Storage Systems" IEEE Computer pp. 33(8):61-68 Aug. 2000.
"File system usage in Windows NT 4.0" 17th ACM Symposium on Operating Systems Principles pp. 93-109 Dec. 1999.
"Frangipani: A Scalable Distributed File System" 16th ACM Symposium on Operating Systems Principles pp. 224-237 1997.
"Scalability in the XFS File System" USENIX Annual Technical Conference 15 pages 1996.
"Design and Implementation of the Sun Network Filesystem" Summer USENIX Conference pp. 119-130 Jun. 1985.
"The Protection of Information in Computer Systems" Proceedings of the IEEE 63(9) pp. 1278-1308 Sep. 1975.
"S.M.A.R.T. Phase-II" No. WP-9803-001 Maxtor Corporation 3 pages Feb. 1998.
"Accessing Nearby Copies of Replicated Objects in a Distributed Environment" Theory of Computing Systems pp. 32:241-280 1999.
The OceanStore Project web pages http://ocenstore.cs.berkeley.edu/info/overview.html 2 pages last modified Jul. 8, 2002.
"A Fast File System for Unix" ACM Transactions on Computer Sytems V 2 N 3 pp. 181-197 Aug. 1984.
"Computing Replica Placement in Distributed Systems" IEEE Second Workshop on Replicated Data pp. 58-61 Nov. 1992.
"Separating Key Management from File System Security" 17th ACM Symposium on Operating Systems Principles pp. 124-4139 Dec. 1999.
"Petal: Distributed Virtual Disks" Seventh International Conference on Architectural Support for Programming Languages and Operating Systems' pp. 84-92 Oct. 1996.
"OceanStore: An Architecture for Global-Scale Persistent Storage" Proceedings of the Ninth International Conference on Architectural Support for Programming Languages and Operating Systems 12 pages Nov. 2000.
"Disconnected Operation in the Coda File System" ACM Transactions on Computer Systems V 10 N 1 pp. 3-25 Feb. 1992.
"Scale and Performance in a Distributed File System" ACM Transactions on Computer Systems pp. 51-81 Feb. 1988.
"Towards an Archival Intermemory" IEEE International forum on Research and Technology Advances in Digital Libraries pp. 147-156 Apr. 1998.
"Summary Cache: A Scalable Wide-Area Web Cache Sharing Protocol" ACM SIGCOMM pp. 254-265 1998.
"A Large-Scale Study of File-System Contents" SIGMETRICS pp. 59-70 May 1999.
"Freenet: A Distributed Anonymous Information Storage and Retrieval System" ICSI Workshop on Design Issues in Anonymity and Unobservability 21 pages Jul. 2000.

David R Cheriton and Timothy P. Mann, Decentralizing a Global Naming Service for Improved Performance and Fault Tolerance, (1989) pp. 147-183.
Matt Evans, FTFS: The Design of a Fault Tolerant Distrubted File-System, (2000), pp. 1-49.
"Proactive Recovery in a Byznatine-Fault-Tolerant System" 4th Symposium on Operating Systems Design and Implmentation pp. 273-287 Oct. 2000.
ISU: http://www.isu.edu/departments/comcom/unix/workshop/shell.html.
"Practical Byzantine Fauyt Tolerence" Proceedings of the Third Symposium on Operating Systems Design and Implementation 14 pages Feb. 1999.
Experience of Adaptive Replication in Distributed File Systems' 22nd IEEE Euromicro 10 pages Sep. 1996.
"Single Instance Storage in Windows 2000" Proceedings of the 4th USENIX Windows Systems Symposium pp. 13-24 Aug. 2000.
"Feasibility of a Serverless Distributed File System Depolyed on an Existing Set of Desktop PCs" Proceedings of the International Conference on Measurement and Modeling of Computer Systems pp. 34-43 Jun. 17-21, 2000.
Serverless Network File Systems 15th Symposium on Operating Systems Principles pp. 109-126 Dec. 1995.
"The Eternity Service" PRAGO-CRYPT pp. 242-252 Oct. 1996.
Coulouris, et al., Distributed Systems:, Japan, Denkishoin Co., Ltd., Second Edition, Oct. 31, 1997, pp. 785-827.
Ferbrache, "A Pathology of Computer Viruse", Springer-Verlag London Limited, 1992, pp. 1-6.
Miller et al, "Strong Security for Distributed File Systems", 2001 IEEE, pp. 34-40.
From internet: http://web.archive.org/web/*/http://www.isu.edu/departments/comcom/unix/workshop/shell.html, retrieved on Oct. 28, 2005.
From the Internet: http://www.isu.edu/departments/comcom/unix.workshop/, retrieved Sep. 28, 2005.
Federal Information Processing Standards Publication 186: Digital Signature Standard (DSS). 1994.
Borg, Digital Signatures Keep Cyberstreets Safe for Shoppers, Computer Technology Review, vol. 16, No. 2, Feb. 1996 p. 1.
Hu, Some Thoughts on Agent Trust and Delegation, Available at http://www.cs.nccu.edu.tw/jong, 2001, pp. 489-496.
Larson, "UDP Lite for Real Time Multimedia Applications", HP Laboraties Bristol, Apr. 1999.
Menezes, et al., "Handbook of Applied Cryptography", CRC Press, 1997, Chapters 7 and 11, 128 pages.
Pfleeger, "Security in Computing", Prentice Hall, 2nd edition, 1996, pp. 63-64.
"Reserved word", Computer Hope, 2002, 1 page, retrieved on Sep. 30, 2009 at <<http://www.computerhope.com/jargon/r/reseword>>.
Rosenblum, et al., "The Design and Implementation of a Log-Structured File System", Electrical Engineering and Computer Sciences, Computer Science Division University of California, Jul. 1991, 15 pages.
Verstak, "FAT Filenames", Sep. 2000, 3 pages, retrieved on Sep. 30, 2009 at <<http://averstak.tripod.com/fatdox/names/htm>>.
Surendar, Chandra, et. al., "CSCI {4,6} Ubiquitous Programming", Jan. 17, 2001, 23 pages.
"Free Riding on Gnutella" Xerox PARC Technical Report pp. 1-22 Aug. 2000.
Decentralizing a Global Naming Seriice for Improved Performance and Fault Tolerance May 1989 pp. 147-183.

* cited by examiner

ENCRYPTED KEY CACHE

RELATED APPLICATIONS

This application is a continuation of U.S. patent application Ser. No. 09/817,812, filed Mar. 26, 2001, which is hereby incorporated by reference herein.

TECHNICAL FIELD

This invention relates to cryptography, and more particularly to improving decryption performance using an encrypted key cache.

BACKGROUND OF THE INVENTION

File systems manage files and other data objects stored on computer systems. File systems were originally built into the computer operating system to facilitate access to files stored locally on resident storage media. As personal computers became networked, some file storage capabilities were off-loaded from individual user machines to special storage servers that stored large numbers of files on behalf of the user machines. When a file was needed, the user machine simply requested the file from the server. In this server-based architecture, the file system is extended to facilitate management of and access to files stored remotely at the storage server over a network.

Today, file storage is migrating toward a model in which files are stored on various networked computers, rather than on a central storage server. One challenge faced in storing files on remote computers concerns controlling access to files that may be distributed over many different computers in a manner that allows an authorized user to access a file while at the same time insuring that unauthorized users are prevented from accessing the file. A co-pending U.S. patent application Ser. No. 09/814,259, entitled "On-Disk File Format for a Serverless Distributed File System", to inventors William J. Bolosky, Gerald Cermak, Atul Adya, and John R. Douceur describes a file format that provides such allowances and assurances. This application is hereby incorporated by reference.

In accordance with this file format, files are encrypted using a symmetric key, and then the symmetric key is encrypted with the public key of a public/private key pair corresponding to each user that is authorized to access the file. Thus, only the user with the correct private key is able to decrypt the symmetric key, which can then be used to decrypt the file. Although the security provided in systems employing this file format is very good, a problem that remains is that a significant amount of computational effort is involved in the use of public/private key encryption and decryption.

The invention addresses these problems and provides solutions to improved decryption performance that are effective for distributed file systems, and in particular, serverless distributed file systems.

SUMMARY OF THE INVENTION

An encrypted key cache is described herein.

In accordance with one aspect, a file that has been encrypted using a symmetric key and that has a corresponding access control entry with the symmetric key encrypted using the public key of a public/private key pair is accessed. An encrypted key cache is accessed to determine whether an access control entry to symmetric key mapping exists in the cache for the access control entry corresponding to the file. If such a mapping exists in the cache, then the mapped-to symmetric key is obtained from the cache, otherwise the encrypted symmetric key is decrypted using the private key of the public/private key pair.

In accordance with another aspect, an encrypted key cache includes multiple entries each of which maps an access control entry corresponding to a file in a distributed file system to a symmetric key used to encrypt that file. The encrypted key cache is also stored as an encrypted file within the distributed file system, allowing the entries of the cache to be used across multiple sessions. The encrypted key cache is stored in a file that can be encrypted using the private key of a public/private key pair corresponding to a user, or alternatively encrypted using a symmetric key and the symmetric key encrypted using the private key of a public/private key pair corresponding to the user and stored in an access control entry corresponding to the encrypted file.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The discussions herein assume a basic understanding of cryptography by the reader. For a basic introduction of cryptography, the reader is directed to a text written by Bruce Schneier and entitled "Applied Cryptography: Protocols, Algorithms, and Source Code in C," published by John Wiley & Sons with copyright 1994 (or second edition with copyright 1996).

The following discussion is directed to an encrypted key cache used to decrypt files in a distributed file system. The file system is described in the context of a symbiotic, serverless, distributed file system that runs on multiple networked computers and stores files across the computers rather than on a central server or cluster of servers. The symbiotic nature implies that the machines cooperate but do not completely trust one another. The file system does not manage the storage disk directly, but rather relies on existing file systems on local machines, such as those file systems integrated into operating systems (e.g., the Windows NT® file system).

While the file system is described in the context of storing "files", it should be noted that other types of storable data can be stored in the file system. The term "file" is used for discussion purposes and is intended to include data objects or essentially any other storage subject matter that may not be commonly characterized as a "file".

Figure 1:
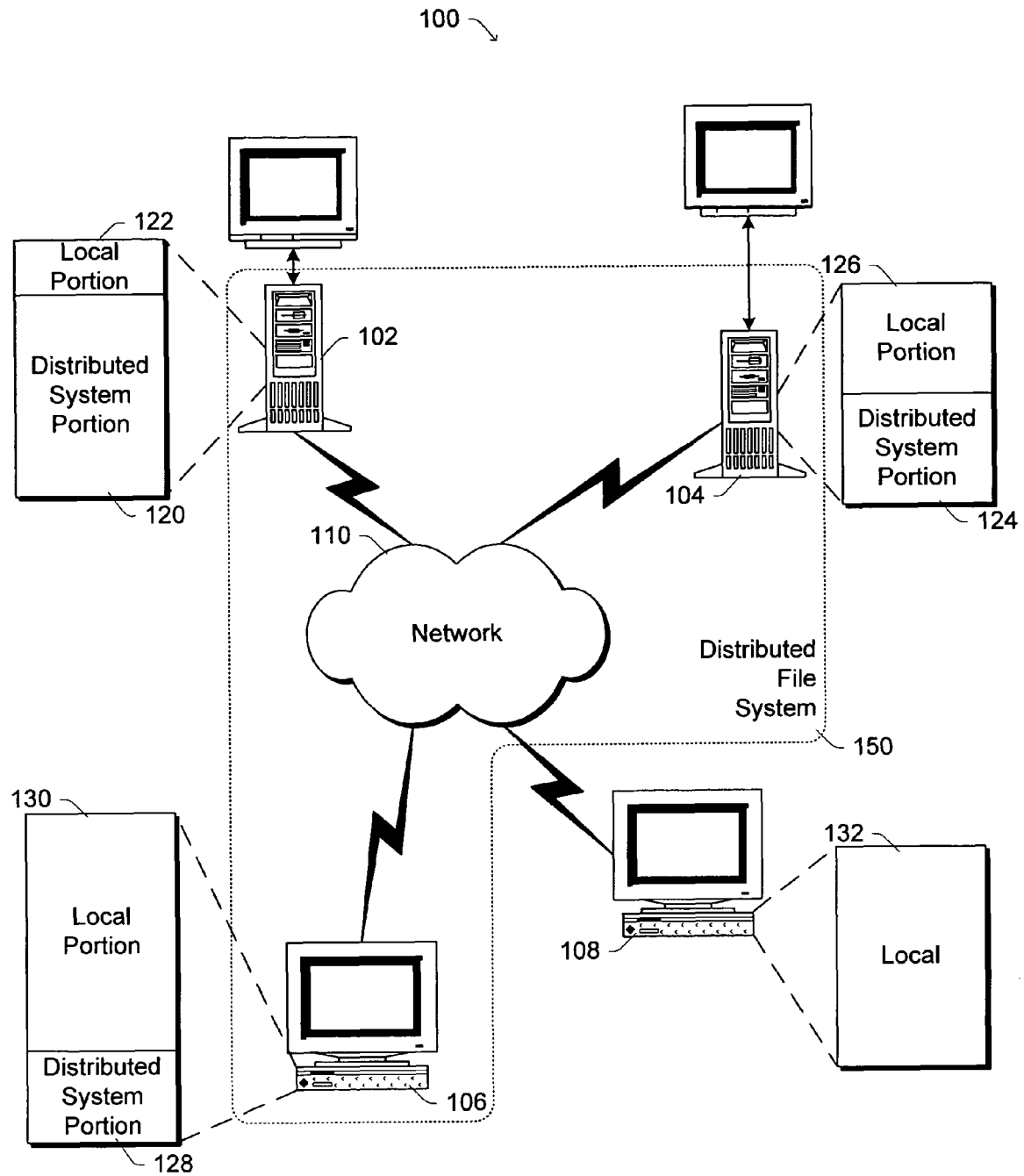
FIG. 1 illustrates an exemplary network environment that supports a serverless distributed file system

FIG. 1 illustrates an exemplary network environment 100 that supports a serverless distributed file system. Four client computing devices 102, 104, 106, and 108 are coupled together via a data communications network 110. Although four computing devices are illustrated, different numbers (either greater or fewer than four) may be included in network environment 100.

Network 110 represents any of a wide variety of data communications networks. Network 110 may include public portions (e.g., the Internet) as well as private portions (e.g., an internal corporate Local Area Network (LAN)), as well as combinations of public and private portions. Network 110 may be implemented using any one or more of a wide variety of conventional communications media including both wired and wireless media. Any of a wide variety of communications protocols can be used to communicate data via network 110, including both public and proprietary protocols. Examples of such protocols include TCP/IP, IPX/SPX, NetBEUI, etc.

Computing devices 102-108 represent any of a wide range of computing devices, and each device may be the same or different. By way of example, devices 102-108 may be desktop computers, laptop computers, handheld or pocket computers, personal digital assistants (PDAs), cellular phones, Internet appliances, consumer electronics devices, gaming consoles, and so forth.

Two or more of devices 102-108 operate to implement a serverless distributed file system (although some of them may not be operational (e.g., failed or powered-down) at any given time). The actual devices included in the serverless distributed file system can change over time, allowing new devices to be added to the system and other devices to be removed from the system. Each device 102-108 that is part of the distributed file system has different portions of its mass storage device(s) (e.g., hard disk drive) allocated for use as either local storage or distributed storage. The local storage is used for data that the user desires to store on his or her local machine and not in the distributed file system structure. The distributed storage portion is used for data that the user of the device (or another device) desires to store within the distributed file system structure.

In the illustrated example of FIG. 1, certain devices connected to network 110 have one or more mass storage devices that include both a portion used by the local machine and a portion used by the distributed file system. The amount allocated to distributed or local storage varies among the devices and can vary over time. For example, device 102 has a larger percentage allocated for a distributed system portion 120 in comparison to the local portion 122; device 104 includes a distributed system portion 124 that is approximately the same size as the local portion 126; and device 106 has a smaller percentage allocated for a distributed system portion 128 in comparison to the local portion 130. The storage separation into multiple portions may occur on a per storage device basis (e.g., one hard drive is designated for use in the distributed system while another is designated solely for local use), and/or within a single storage device (e.g., part of one hard drive may be designated for use in the distributed system while another part is designated for local use). Other devices connected to network 110, such as computing device 108, may not be part of the distributed file system and thus such devices do not have any of their mass storage device(s) allocated for use by the distributed system. Hence, device 108 has only a local portion 132.

A distributed file system 150 operates to store one or more copies of files on different computing devices 102-106. When a new file is created by the user of a computer, he or she has the option of storing the file on the local portion of his or her computing device, or alternatively in the distributed file system. If the file is stored in the distributed file system 150, the file will be stored in the distributed system portion of the mass storage device(s) of one or more of devices 102-106. The user creating the file typically has no ability to control which device 102-106 the file is stored on, nor any knowledge of which device 102-106 the file is stored on. Additionally, replicated copies of the file will typically be saved, allowing the user to subsequently retrieve the file even if one of the computing devices 102-106 on which the file is saved is unavailable (e.g., is powered-down, is malfunctioning, etc.).

The distributed file system 150 is implemented by one or more components on each of the devices 102-106, thereby obviating the need for any centralized server to coordinate the file system. These components operate to determine where particular files are stored, how many copies of the files are created for storage on different devices, and so forth. Exactly which device will store which files depends on numerous factors, including the number of devices in the distributed file system, the storage space allocated to the file system from each of the devices, how many copies of the file are to be saved, the number of files already stored on the devices, and so on. Thus, the distributed file system allows the user to create and access files (as well as folders or directories) without any knowledge of exactly which other computing device(s) the file is being stored on.

The files stored by the file system are distributed among the various devices 102-106 and stored in encrypted form. When a new file is created, the device on which the file is being created encrypts the file prior to communicating the file to other device(s) for storage. The directory entry (e.g., the file name) for a new file is also communicated to the other device(s) for storage. Additionally, if a new folder or directory is created, the directory entry (e.g., folder name or directory name) is also communicated to the other device(s) for storage. As used herein, a directory entry refers to any entry that can be added to a file system directory, including both file names and directory (or folder) names.

The distributed file system 150 is designed to prevent unauthorized users from reading data stored on one of the devices 102-106. Thus, a file created by device 102 and stored on device 104 is not readable by the user of device 104 (unless he or she is authorized to do so). In order to implement such security, the contents of files as well as all directory entries are encrypted, and only authorized users are given the decryption key. Thus, although device 104 may store a file created by device 102, if the user of device 104 is not an authorized user of the file, the user of device 104 cannot decrypt (and thus cannot read) either the contents of the file or its directory entry (e.g., filename).

Files can optionally be encrypted using a technology known as "convergent encryption". Convergent encryption has the following two properties. First, if two or more encryptable objects are identical, then even if different encryption keys are utilized to encrypt them to provide individual cipher objects, one does not need to have access to any of the encryption keys to determine from an examination of the cipher objects that the encryptable objects are identical. Second, if two or more encryptable objects are identical but are encrypted with different encryption keys, the total space that is required to store all of the cipher objects is proportional to the space that is required to store a single encryptable object, plus a constant amount of storage for each distinct encryption key.

Generally, according to convergent encryption, a file F (or any other type of encryptable object) is initially hashed using a one-way hashing function h (e.g., SHA, MD5, etc.) to produce a hash value h(F). The file F is then encrypted using a symmetric cipher (e.g., RC4, RC2, etc.) with the hash value as the key, or $E_{h(F)}(F)$. Next, read access control entries are created for each authorized user who is granted read access to the encrypted file. The access control entries are formed by encrypting the file's hash value h(F) with any number of keys $K_1, K_2, \ldots, K_m$, to yield $E_{K1}(h(F)), E_{K2}(h(F)), \ldots, E_{Km}(h(F))$. The keys K are randomly generated and uniquely assigned to individual users. In one implementation, each key K is the user's public key of a public/private key pair. In the illustrated example, write access control is governed by the directory server that stores the directory entry for the file and it is thus not addressed by the file format (so references to "access" is within this document refer to read access unless specifically identified as another type of access). Alternatively, write access control could be implemented via access control entries in a manner analogous to the read access control discussed herein.

With convergent encryption, one encrypted version of the file is stored and replicated among the serverless distributed file system 150. Along with the encrypted version of the file is stored one or more access control entries depending upon the number of authorized users who have access. Thus, a file in the distributed file system 150 has the following structure:

$$[E_{h(F)}(F), <E_{K1}(h(F))>, <E_{K2}(h(F))>, \ldots, <E_{Km}(h(F))>]$$

One advantage of convergent encryption is that the encrypted file can be evaluated by the file system to determine whether it is identical to another file without resorting to any decryption (and hence, without knowledge of any encryption keys). Unwanted duplicative files can be removed by adding the authorized user(s) access control entries to the remaining file. Another advantage is that the access control entries are very small in size, on the order of bytes as compared to possibly gigabytes for the encrypted file. As a result, the amount of overhead information that is stored in each file is reduced. This enables the property that the total space used to store the file is proportional to the space that is required to store a single encrypted file, plus a constant amount of storage for each additional authorized reader of the file.

For more information on convergent encryption, the reader is directed to co-pending U.S. patent application Ser. No. 09/565,821, entitled "Encryption Systems and Methods for Identifying and Coalescing Identical Objects Encrypted with Different Keys", which was filed May 5, 2000, in the names of Douceur et al., and is commonly assigned to Microsoft Corporation. This application is hereby incorporated by reference.

For small files, the entire file is hashed and encrypted using convergent encryption, and the resulting hash value is used as the encryption key. The encrypted file can be verified without knowledge of the key or any need to decrypt the file first. For large files, the file contents are broken into smaller blocks and then convergent encryption is applied separately to each block. For example, the file F may be segmented into "n" pages $F^0 - F^{n-1}$, where each page is a fixed size (e.g., a 4 Kbyte size). Convergent encryption is then applied to the file at the block level. That is, each block $F^i$ is separately hashed using a one-way hash function (e.g., SHA, MD5, etc.) to produce a hash value $h(F^i)$. Each block $F^i$ is then encrypted using a symmetric cipher (e.g., RC4, RC2, etc.) with the hash value $h(F^i)$ as the key, or $E_{h(Fi)}(F^i)$, resulting in an array of encrypted blocks which form the contents of the file. For more information on block-by-block encryption, the reader is directed to co-pending U.S. patent application Ser. No. 09/814,259, entitled "On-Disk File Format for a Serverless Distributed File System", to inventors William J. Bolosky, Gerald Cermak, Atul Adya, and John R. Douceur.

Figure 2:
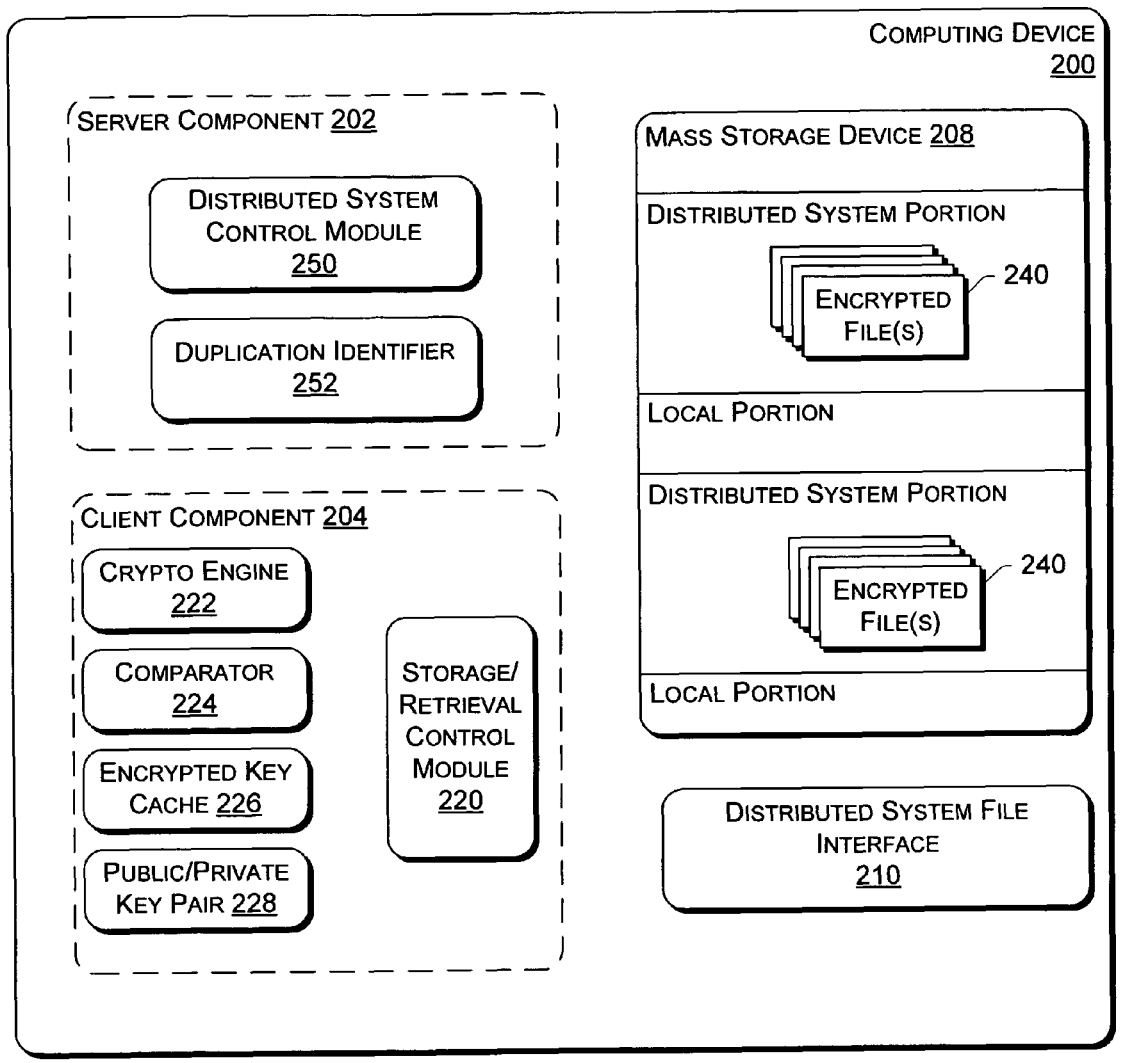
FIG. 2 illustrates logical components of an exemplary computing device that is representative of a device that participates in a distributed file system.

FIG. 2 illustrates logical components of an exemplary computing device 200 that is representative of any one of the devices 102-106 of FIG. 1 that participate in the distributed file system 150. Computing device 200 includes a server component 202, a client component 204, a mass storage device 208, and a distributed file system interface 210. Computing device 200 also typically includes additional components (e.g., a processor), however these additional components have not been shown in FIG. 2 so as not to clutter the drawings. A more general description of a computer architecture with various hardware and software components is described below with reference to FIG. 7.

Mass storage device 208 can be any of a wide variety of conventional nonvolatile storage devices, such as a magnetic disk, optical disk, Flash memory, and so forth. Mass storage device 208 is partitioned into a distributed system portion and a local portion; this partitioning may change over time.

Computing device 200 is intended to be used in a serverless distributed file system, and as such includes both a server component 202 and client component 204. Server component 202 handles requests when device 200 is responding to a request involving a file or directory entry stored (or to be stored) in storage device 208, while client component 204 handles the issuance of requests by device 200 for files stored (or to be stored) in the distributed file system. Client component 204 and server component 202 operate independent of one another. Thus, situations can arise where the serverless distributed file system 150 causes files being stored by client component 204 to be stored in mass storage device 208 by server component 202.

Client component 204 includes a storage and retrieval control module 220, which along with interface 210, manages access to the serverless distributed file system 150 for the creation, storage, retrieval, reading, writing, modifying, and verifying of files and directories on behalf of computing device 150. The control module 220 uses a cryptographic engine 222, a comparator 224, an encrypted key cache 226, and public/private key pair 228 when handling the encrypted files 240 stored in the distributed system portion of the mass storage 208. These components are described in more detail below.

The server component 202 includes a distributed system control module 250 and a duplication identifier 252. Distributed system control module 250 manages access to the encrypted files 240. It communicates with mass storage device 208 to store and retrieve encrypted files 240. Distributed system control module 250 also maintains a record of the encrypted directory entries (not shown) in mass storage device 208 that are stored at computing device 200 (or alternatively that are stored elsewhere in the serverless distributed file system).

Duplication identifier 252 helps identify identical encrypted files in the distributed file system. When the duplication identifier 252 finds a duplication that is not an intentional replication for fault tolerant purposes, the duplication identifier 252 notifies the control module 250, which then eliminates the duplicated file and adds the access control entries to the eliminated file to the remaining file.

Figure 3:
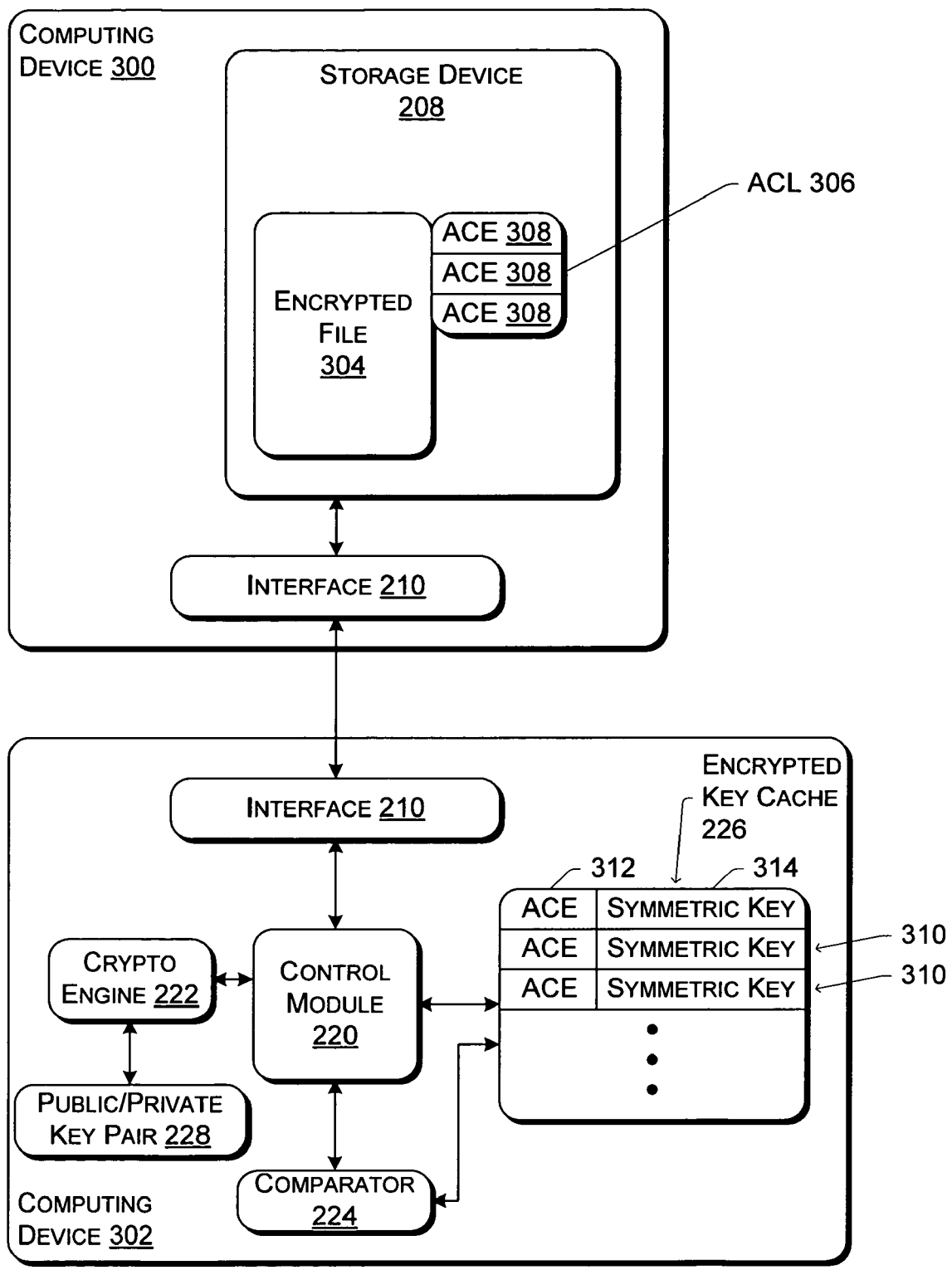
FIG. 3 illustrates an exemplary distributed file system in accordance with certain embodiments of the invention.

FIG. 3 illustrates an exemplary distributed file system in accordance with certain embodiments of the invention. Two computing devices 300 and 302 are illustrated, each of which is a computing device 200 of FIG. 2 that is part of distributed file system 150 of FIG. 1. For ease of explanation and to avoid cluttering the drawings, some components and modules of computing devices 300 and 302 are not illustrated in FIG. 3.

Computing device 300 includes a storage device 208 and an interface 210. Storage device 208 can store multiple files, one of which (encrypted file 304) is illustrated in FIG. 3. File 304 has a corresponding access control list 306 including multiple access control entries 308. Files are stored on storage device 208 using a file format that is composed of two parts: a data stream and a metadata stream. The data stream contains the contents of the file, which makes up the bulk of the entire file. The data stream is a primary (unnamed) data stream, while the metadata stream of the file is a separate named stream. In the illustrated example, encrypted file 304 is the data stream and access control list is included in the metadata stream.

Although access control list 306 is illustrated as being stored in storage device 208 along with its corresponding file 304, access control list 306 may alternatively be stored separately (either on computing device 300 or alternatively another computing device (not shown)). For example, each file stored in storage device 208 has a corresponding directory entry in a directory service on device 300 or some other device, and access control list 306 may be stored along with this corresponding directory entry.

An access control entry 308 includes an identification of the user (e.g., by the user name assigned to the user for the serverless distributed file system) and also an encrypted version of the symmetric key used to encrypt the file. The symmetric key is encrypted using the public key of a public/private key pair of the user that corresponds to the access control entry, so that only that user (who holds the private key of the public/private key pair) is able to decrypt the encrypted symmetric key from that access control entry. Thus, each access control entry will include a different encrypted symmetric key, but all will decrypt (using the appropriate private keys) to the same symmetric key.

Computing device 302 is illustrated including interface 210, storage/retrieval control module 220, cryptographic engine 222, comparator 224, encrypted key cache 226, and public/private key pair 228. Computing devices 300 and 302 communicate with one another via their respective interfaces 210. When a file is requested (e.g., by a user of computing device 302), control module 220 obtains the requested file and access control entry corresponding to the user requesting the file and communicates with cryptographic engine 222, and possibly comparator 224, to decrypt the received file.

Cryptographic engine 222 can use any one or more of a wide variety of conventional encryption algorithms (e.g., RC2, RC4, etc.) to decrypt data. Cryptographic engine 222 makes use of a symmetric key, received from another device, to decrypt data (e.g., in the discussion above regarding convergent encryption, the hash value h(F) is the symmetric key). Cryptographic engine 222 may also make use of one or both keys of public/private key pair 228, such as to decrypt data that was encrypted by another device using the public key of key pair 228. In certain situations, rather than having decryption module 316 use the private key of key pair 228 to perform certain decryptions, control module 220 may obtain the appropriate decrypted symmetric key from a cache 226 of encrypted keys (referred to as the encrypted key cache), as discussed in more detail below.

To grant access privileges to multiple users, the file system 150 maintains a user key list (referred to as an access control list or ACL) for each file. Each entry (referred to as an access control entry or ACE) in the ACL contains the data used by specific users to decrypt the file. More particularly, when a file is created by a computing device, it is encrypted using a symmetric key. The symmetric key can be generated in any of a wide variety of manners, such as randomly or derived by the file contents in some manner (e.g., using convergent encryption discussed above). Separate ACLs may be maintained for each type of access right (e.g., read access, modify/write access, etc.), or alternatively a single ACL may be maintained with each ACE indicating what access rights the corresponding user has to the file. Generally, read ACLs are addressed in this document.

Figure 4:
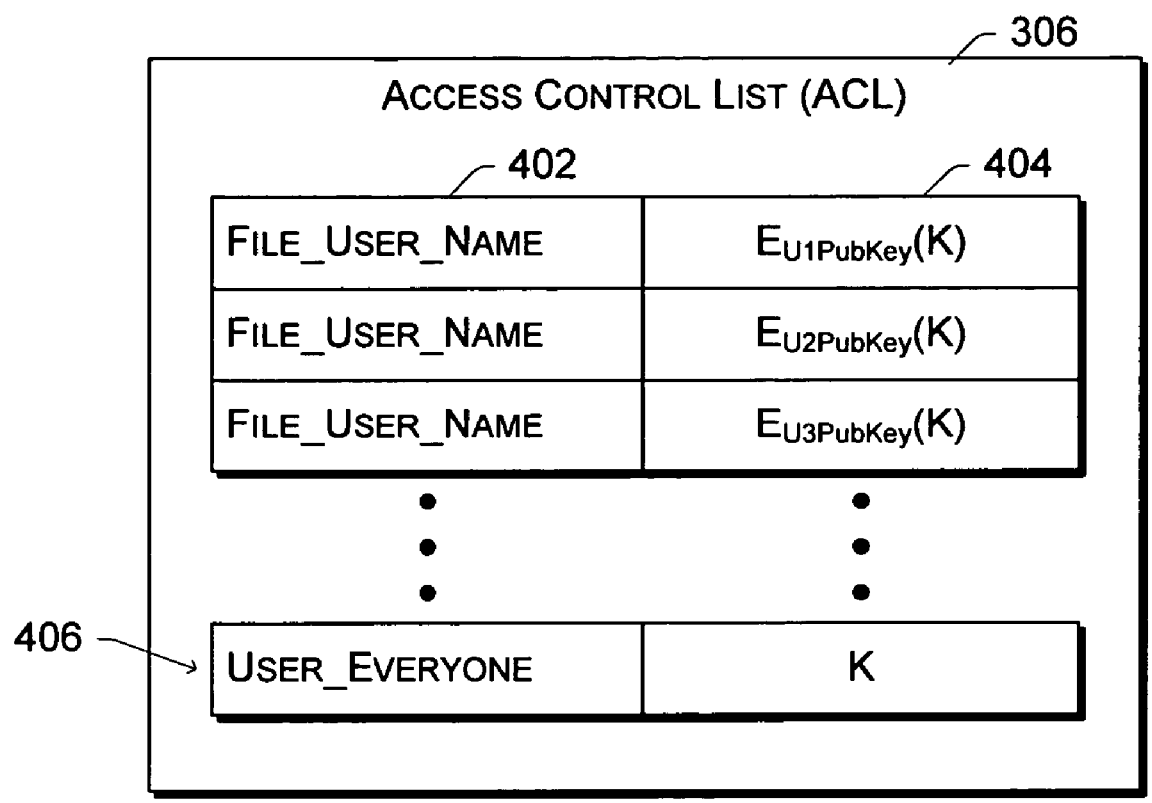
FIG. 4 illustrates an exemplary access control list corresponding to a file in accordance with certain embodiments of the invention.

FIG. 4 illustrates an exemplary access control list corresponding to a file in accordance with certain embodiments of the invention. Each entry in list 306 includes a user name 402 of the user (or user group) with access privileges and an encrypted symmetric key 404 encrypted with the public key corresponding to that user (or user group). If the file is publicly readable, the key list contains only a special entry 406, in which the FILE_USER_NAME is the reserved value USER_EVERYONE to indicate that everyone has access to the file, and the associated encrypted key segment 404 contains the symmetric key in decrypted form.

Since files are stored on machines that are not trusted, read access cannot be sufficiently controlled merely by listing the authorized readers of a file in the metadata, as is commonly done in trusted file systems. Thus, this file format relies on cryptography to provide access security. Only a user with knowledge of an appropriate private key will be able to recover the symmetric key used to encrypt the file. As a result, an impostor who attempts to recover the symmetric key using an authorized user's name will be unable to decrypt the symmetric key because that impostor does not have knowledge of the user's private key.

Returning to FIG. 3, assume for purposes of explanation that computing device 302 desires to access encrypted file 304 (e.g., in response to a request from a user to open or print file 304). The file request is communicated to computing device 300, which in turn communicates encrypted file 304 and corresponding ACL 306 to computing device 302. Computing device 300 may return the entire ACL 306 to computing device 302, or alternatively only the ACEs that the requesting user is part of (e.g., ACEs identifying the user name or a user group that the user is part of).

Assuming that the entire ACL 306 is returned to computing device 302, control module 220 identifies each ACE in ACL 306 that the user of computing device 302 corresponds to (e.g., is either that user or the user is part of the group identified in the ACE). Control module 220 then has comparator 224 check encrypted key cache 226 to determine whether an ACE to symmetric key mapping exists in cache 226 for any of the ACEs that the user corresponds to. If such a mapping exists, then control module 220 forwards the mapped-to symmetric key from cache 226 to cryptographic engine 222 to use to decrypt file 304. Thus, if the ACE to symmetric key mapping exists in cache 226, cryptographic engine 222 does not need to expend the effort to decrypt the encrypted symmetric key from the ACE using the private key from key pair 228.

However, if the ACE to symmetric key mapping does not exist in cache 226, then control module 220 has cryptographic engine 222 decrypt the encrypted symmetric key from the ACE using the private key from key pair 228. Although only a single key pair 228 is illustrated, computing device 302 may include multiple key pairs (one corresponding to the user's identifier and one for each additional group that the user is part of). Once decrypted, cryptographic engine 222 communicates the decrypted symmetric key to control module 220, which in turn stores both the ACE and the decrypted symmetric key (and an indication that they map to one another) into cache 226.

Encrypted key cache 226 maintains multiple ACE to symmetric key mappings 310 (each mapping is also referred to as an entry of cache 226). Each mapping 310 includes an ACE portion 312 and a symmetric key portion 314. Each mapping 310 corresponds to an ACE corresponding to a file that has been (or can be) accessed by a user of computing device 302. Each ACE portion 312 includes an ACE that corresponds to both the user of computing device 302 and the file to which mapping 310 corresponds (e.g., one of ACEs 308 if mapping 310 corresponds to encrypted file 304). Each symmetric key portion 314 includes the decrypted symmetric key used to decrypt the file to which mapping 310 corresponds.

The mapping of an ACE to decrypted symmetric key in encrypted key cache 226 can be explicit (e.g., a pointer to where the symmetric key portion of an entry is maintained) or alternatively inherent in the data structure used (e.g., a list of (ACE, key) pairs). As discussed above, each ACE includes a user name and an encrypted symmetric key. In one implementation, encrypted key cache 226 is indexed by the encrypted symmetric key, although alternatively encrypted key cache 226 can be indexed by the user name.

Encrypted key cache 226 can be a variable size. For example, each entry 310 may be maintained in cache 226 so long as the file to which the entry 310 corresponds is requested by a component or module of device 302 within a certain time frame (e.g., at least once every seven days, at least once out of every 300 file accesses, etc.). If the file to which the entry 310 corresponds is not accessed within that certain time frame, then the entry is removed from cache 226. Thus, the size of cache 226 can change over time.

Alternatively, encrypted key cache 226 may be a fixed size. For example, encrypted key cache 226 may be limited to storing 512 entries 310. If an attempt is made to store a new entry to cache 226 and cache 226 is already full (e.g., already stores 512 entries), then a cache replacement process is used to determine which current cache entry is to be deleted to make room for the new cache entry. Any of a wide variety of conventional cache replacement processes can be used, such as the well known least-recently-used (LRU) or least-frequently used (LFU) cache replacement algorithms.

Alternatively, rather than having a timing out or LRU-based cache entry removal, an "active" invalidation model could be used. For example, a cache entry invalidation command or message could be sent by some other entity (e.g., a computing device 200 of FIG. 2) at an appropriate time, such as after the entity learns about the change of the symmetric key for that entry.

Encrypted key cache 226 is indexed based on the ACE portions 312. In order to determine whether a mapping for a received ACE is included in key cache 226, control module 220 has comparator 224 compare the received ACE to the portions 312 and check whether any of the portions 312 match (are the same as) the received ACE. If the ACE portion 312 of one of the mappings 310 matches the received ACE, then that mapping is used to determine the symmetric key for the file.

Checking whether the received ACE matches any of the portions 312 can be performed in any of a wide variety of manners. For example, each portion 312 may be compared to the received ACE until either a match is found or all portions 312 are compared. Alternatively, any of a wide variety of conventional rapid-retrieval data structures may be used to more quickly determine whether a received ACE matches one of the portions 312. For example, a hashing table may be created (by control module 220 or alternatively another module) and the received ACE used in a conventional manner to index into the hashing table, with the resultant hash value indicating which of the portions 312 are possible matches to the received ACE and only those indicated portions 312 compared to the received ACE.

In one implementation, encrypted key cache 226 is also stored by computing device 302 as an encrypted file within the distributed file system 150. By so storing cache 226, cache 226 can persist across multiple sessions (each "session" refers to a user being logged-on to a computing device—a new session begins each time the user logs in to a computing device and the session ends when the user logs off the computing device (either explicitly by selecting a "log off" option or implicitly by powering-down the computing device, having the computing device fail (e.g., crash), etc.)), without placing unencrypted copies of the symmetric keys contained in the cache onto persistent storage, where they might be read by unauthorized parties, e.g. after the user has logged out and another user has logged in.

In order to store key cache 226, when the session ends a component of computing device 302 (e.g., control module 220) stores cache 226 as a file and then has cryptographic engine 222 encrypt the file using a symmetric key. An ACE is then created for the encrypted file, the symmetric key is encrypted using the public key of the user whose session it is, and then the encrypted symmetric key is stored in the ACE. The encrypted file and corresponding ACE is then stored in the file system 150 as if it were any other file. Subsequently, when the user logs on to device 302 again (or alternatively another device), the encrypted file is retrieved, decrypted using the user's private key, and then the populated encrypted key cache 226 is available for decrypting symmetric keys of other files, including all of the entries 310 that were included in cache 226 when the user's previous session ended. It should be noted that the encrypted file containing cache 226 can be retrieved as part of the log-on process, or alternatively only if needed (e.g., the first time the user attempts a read access to another file).

It should also be noted that the file containing cache 226 remains securely stored (in encrypted form) at the remote system even if the device 302 using cache 226 to decrypt symmetric keys is improperly shut down or fails. However, changes made to the cache 226 after device 302 loaded cache 226 but before device 302 shut down or failed may not be reflected in the securely stored cache 226. Alternatively, device 302 may periodically store an encrypted file containing cache 226 at the remote location to guard against such data loss in the event of a failure or improper shut-down.

Alternatively, rather than encrypting the file containing cache 226 with a symmetric key and then encrypting the symmetric key with the public key of the user, the file containing cache 226 may be encrypted just with the public key of the user (no symmetric key being used). Typically, the user (and/or distributed file system designer) will desire the file containing cache 226 to be accessible only to that user and not to any other users. Thus, by encrypting the file with the user's public key, the user will be able to decrypt the file and obtain access to populated cache 226, but others will not be able to decrypt the file.

In another alternative, encrypted key cache 226 may be cleared when computing device 302 is powered-down (either intentionally by deleting each entry or inherently by storing cache 226 in volatile memory). When computing 13 device 302 is subsequently powered-on, encrypted key cache 226 is then re-populated as files are accessed by device 302.

Additionally, situations can arise where the symmetric key with which a file is encrypted is changed. If a change is made to the symmetric key with which a file is encrypted, all ACEs for that file will also change, since each ACE contains the encryption of the symmetric key with a user's public key. If computing device 302 accesses file 304 after the symmetric key for that file has been changed, then the new ACE 308 for the file will not be resident in the key cache 226, even if the file had recently been accessed by computing device 302. Therefore, control module 220 has cryptographic engine 222 decrypt the new encrypted symmetric key from the new ACE using the private key from key pair 228. Once decrypted, the new ACE and corresponding symmetric key are stored in the key cache 226 for future reference. Since the old symmetric key has been discarded, the corresponding old ACE will not be looked up in the key cache again, so the entry in the key cache that contains this ACE will eventually be removed, either when the time frame expires (for a variable size cache) or when the cache replacement algorithm removes this entry after the cache size limit has been reached (for a fixed size cache).

Alternatively, in some implementations it may not be readily apparent if an ACE has changed since it was inserted in key cache 226 (for example, if key cache 226 is indexed by user name rather than by encrypted symmetric key). These situations can be resolved by initially attempting to decrypt the file using the symmetric key from cache 226. If the decryption is verified (e.g., using convergent encryption discussed above), then the file has been successfully decrypted. However, if the decryption fails, the correct symmetric key is decrypted from the received ACE.

It should be noted that, although two different computing devices 300 and 302 are illustrated in FIG. 3, due to the nature of the serverless distributed file system, an encrypted file being retrieved by a computing device may actually be stored in a distributed storage portion of that device (perhaps unbeknownst to the component or module that is requesting the file). In these situations, the file is still stored in encrypted form and is decrypted upon retrieval in the same manner as discussed above.

Figure 5:
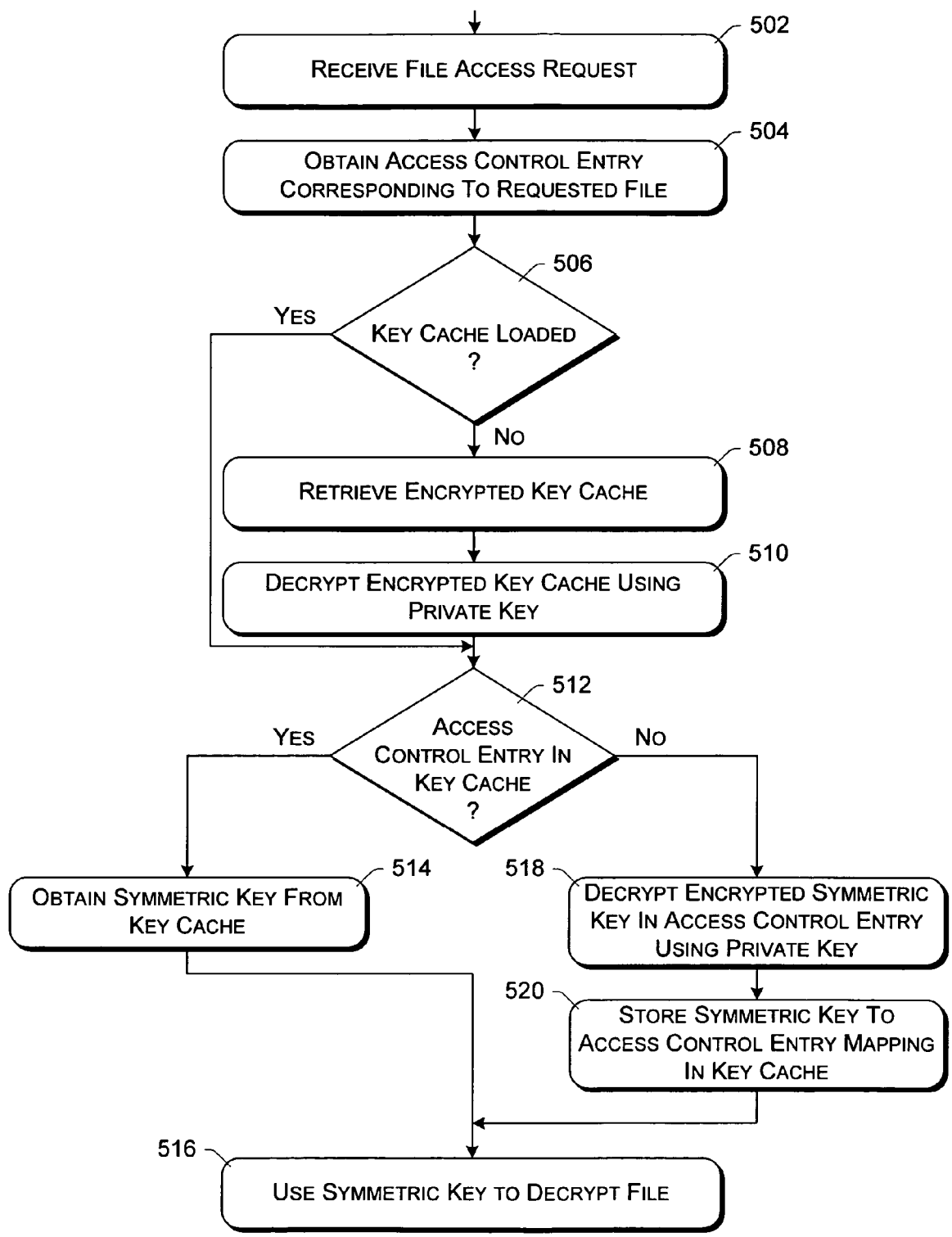
FIG. 5 is a flowchart illustrating an exemplary process for retrieving files using an encrypted key cache in accordance with certain embodiments of the invention.

FIG. 5 is a flowchart illustrating an exemplary process for retrieving files using an encrypted key cache in accordance with certain embodiments of the invention. The process of FIG. 5 is carried out by a client component 204 of FIG. 2, and may be implemented in software.

Initially, a file access request is received (act 502). In response to the request, an access control entry corresponding to the requested file and the user of the computing device making the request is obtained (act 504). A check is then made as to whether the encrypted key cache is currently loaded into the memory of the computing device (act 506). If the encrypted key cache is not loaded into memory, then the encrypted key cache is retrieved (in file form) from the location it is stored at within the distributed file system (act 508). The file containing the encrypted key cache is then decrypted based on the user's private key (act 510) and then a check made as to whether the access control entry obtained in act 504 is in the encrypted key cache (act 512). Returning to act 506, if the encrypted key cache is already loaded into memory, then processing proceeds to act 512 (bypassing acts 508 and 510).

If the access control entry obtained in act 504 is in the encrypted key cache, then the symmetric key associated with the access control entry is retrieved from the encrypted key cache (act 514) and used to decrypt the requested file (act 516). However, if the access control entry obtained in act 504 is not in the encrypted key cache, then the encrypted symmetric key included in the access control entry is decrypted using the requesting user's private key (act 518). A mapping of the access control entry to decrypted symmetric key is then stored in the encrypted key cache (act 520) and the decrypted symmetric key is used to decrypt the requested file (act 516).

Figure 6:
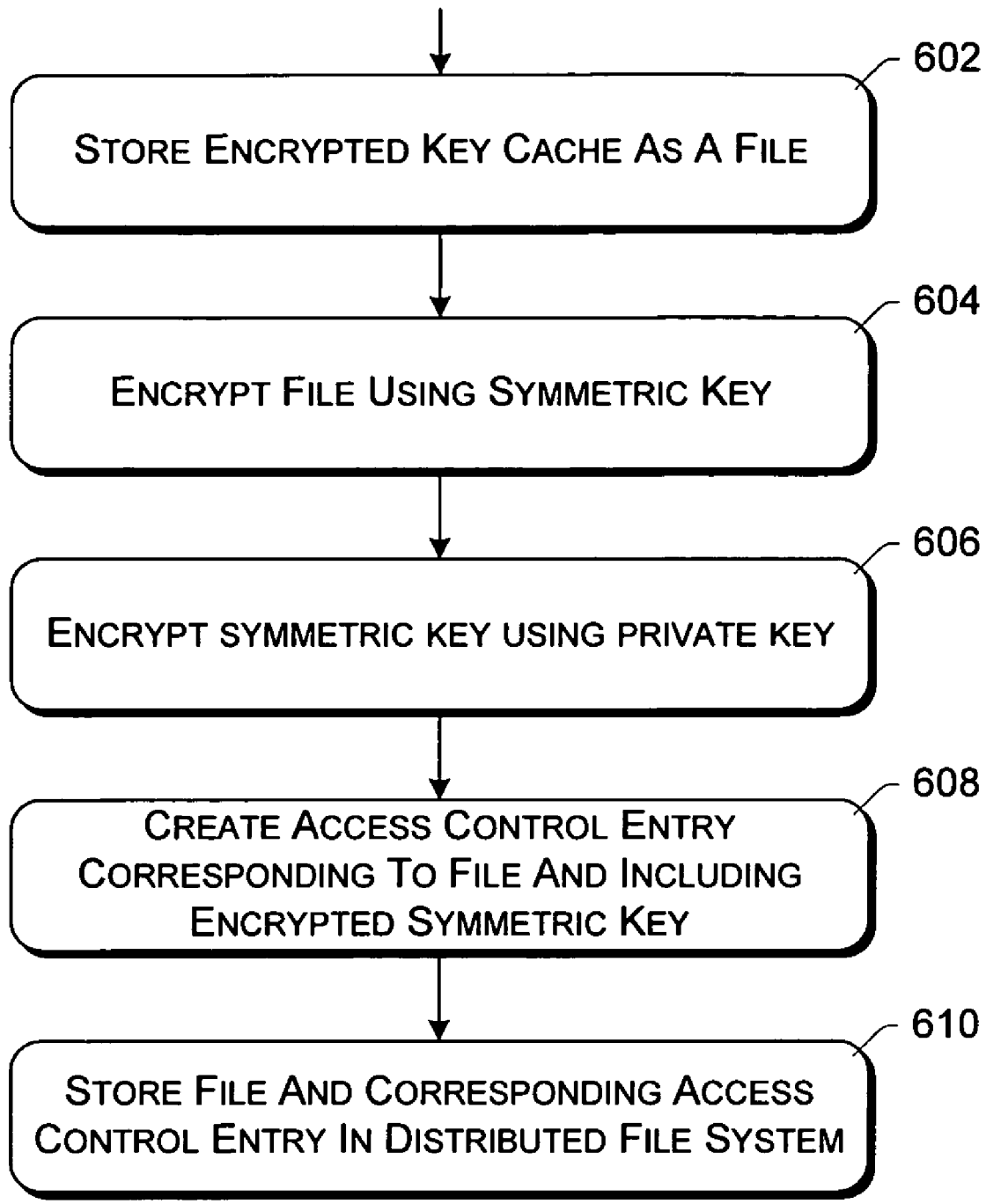
FIG. 6 is a flowchart illustrating an exemplary process for storing an encrypted key cache for use across multiple sessions in accordance with certain embodiments of the invention.

FIG. 6 is a flowchart illustrating an exemplary process for storing an encrypted key cache for use across multiple sessions in accordance with certain embodiments of the invention. The process of FIG. 6 is carried out by a client component 204 of FIG. 2, and may be implemented in software.

Initially, the encrypted key cache is stored as a file (act 602). The file containing the encrypted key cache is then encrypted using a symmetric key (act 604) and the symmetric key is encrypted using a private key of a public/private key pair corresponding to the current user of the computing device (act 606). An access control entry corresponding to the file is then created (act 608), and the file and corresponding access control entry are then stored in the distributed file system (act 610).

Figure 7:
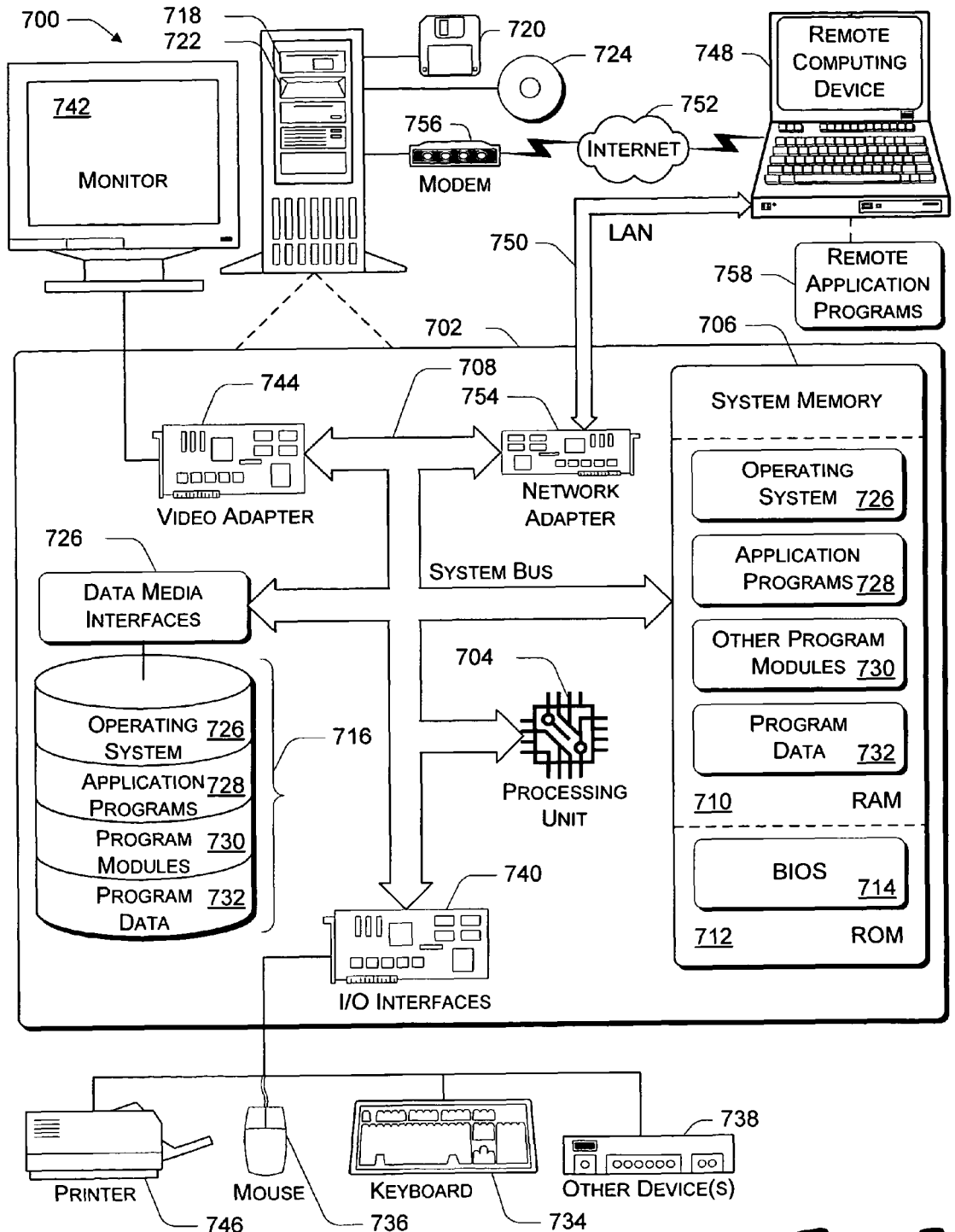
FIG. 7 illustrates a more general exemplary computer environment that can be used to implement the distributed file system.

FIG. 7 illustrates a more general exemplary computer environment 700, which can be used to implement the distributed file system. The computer environment 700 is only one example of a computing environment and is not intended to suggest any limitation as to the scope of use or functionality of the computer and network architectures. Neither should the computer environment 700 be interpreted as having any dependency or requirement relating to any one or combination of components illustrated in the exemplary computer environment 700.

Computer environment 700 includes a general-purpose computing device in the form of a computer 702. Computer 702 can be, for example, any of computing devices 102-108 of FIG. 1, a computing device 200 of FIG. 2, or any of computing devices 300 or 302 of FIG. 3. The components of computer 702 can include, but are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 typically includes a variety of computer readable media. Such media can be any available media that is accessible by computer 702 and includes both volatile and non-volatile media, removable and non-removable media.

The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may implement all or part of the resident components that support the distributed file system.

A user can enter commands and information into computer 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components such as the operating system are illustrated herein as discrete blocks, although it is recognized that such programs and components reside at various times in different storage components of the computing device 702, and are executed by the data processor(s) of the computer.

Computer 702 typically includes at least some form of computer readable media. Computer readable media can be any available media that can be accessed by computer 702. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 702. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described herein in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

It should be noted that, although discussed primarily herein with reference to a serverless distributed file system, the invention can be used in any file system in which it is desired to keep files encrypted so that various other parties cannot see the content of the files. Thus, the invention can be used in other embodiments, such as, for example, those with one or more centralized file servers.

Conclusion

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more non-transitory computer storage media having stored thereon a plurality of instructions that, when executed by one or more processors of a computer, cause the one or more processors to perform the following acts:
   receive a request, corresponding to a user, to access an encrypted file; obtain an access control entry (ACE) from an access control list (ACL) of a plurality of ACEs, the ACE corresponding to both the user and the requested encrypted file, wherein the ACE includes an encrypted version of a symmetric key that was used to encrypt the encrypted file;
   access an encrypted key cache, the encrypted key cache having multiple ACE-to-symmetric-key-mapped entries, each entry having a reference to one or more ACEs mapped to at least one unencrypted symmetric key;
   identify at least one entry of the multiple ACE-to-symmetric-key-mapped entries of the encrypted key cache that has a reference to an ACE that both matches the ACE of the ACL and is mapped to an unencrypted symmetric key that matches the symmetric key that was used to encrypt the encrypted file;
   responsive to identifying the at least one identified entry, decrypt the encrypted file using the mapped unencrypted symmetric key from the identified entry of the encrypted key cache; and
   responsive to failing to identify the at least one identified entry, decrypt the encrypted symmetric key from the ACE of the ACL and decrypt the unencrypted file using the decrypted symmetric key.

2. One or more non-transitory computer storage media as recited in claim 1, wherein decrypting the encrypted symmetric key comprises using a private key of a public/private key pair associated with the user to decrypt the symmetric key.

3. One or more non-transitory computer storage media as recited in claim 1, wherein the plurality of instructions further cause the one or more processors to perform the following acts: receive the access control list; select one of the plurality of access control entries that corresponds to the user; and use, as the access control entry, the selected one of the plurality of access control entries.

4. One or more non-transitory computer storage media as recited in claim 1, wherein the plurality of instructions further cause the one or more processors to perform, responsive to failing to identify the at least one identified entry, the following: create, after decrypting the encrypted symmetric key, a new mapping in the encrypted key cache that maps the access control entry to the symmetric key.

5. One or more non-transitory computer storage media as recited in claim 1, wherein the plurality of instructions further cause the one or more processors to perform the following acts: generate a file including the encrypted key cache; encrypt the generated file using a private key of a public/private key pair associated with the user; and store the encrypted file.

6. One or more non-transitory computer storage media as recited in claim 1, wherein the plurality of instructions further cause the one or more processors to perform the following acts: generate a file including the encrypted key cache; encrypt the generated file with another symmetric key; generate a new access control entry corresponding to the generated file; encrypt the other symmetric key with a public key of a public/private key pair associated with the user; and store both the encrypted other symmetric key and an identifier of the user corresponding to the key cache in the new access control entry.

7. One or more non-transitory computer storage media as recited in claim 1, wherein the plurality of instructions further cause the one or more processors to perform the following acts: obtain, in encrypted form, the encrypted key cache from a remote storage device; decrypt the key cache using a private key of a public/private key pair associated with the user; and use, as the encrypted key cache, the decrypted key cache.

8. One or more non-transitory computer storage media as recited in claim 7, wherein decrypting the key cache comprises: decrypting, using the private key, a symmetric key corresponding to the key cache; and decrypting, using the symmetric key corresponding to the key cache, the key cache.

9. One or more non-transitory computer storage media as recited in claim 1, wherein the identifying comprises indexing into the encrypted key cache based on the encrypted symmetric key of the access control entry.

10. One or more non-transitory computer storage media as recited in claim 1, wherein the identifying comprises indexing into the encrypted key cache based on a user name included in the access control entry.

11. One or more non-transitory computer storage media as recited in claim 1, wherein the plurality of instructions further cause the one or more processors to perform the following acts: removing one entry from the encrypted key cache while leaving one or more other entries in the encrypted key cache.

12. One or more non-transitory computer storage media as recited in claim 11, wherein the removing comprises removing the one entries entry if the one entries entry has not been accessed within a certain time frame.

13. One or more non-transitory computer storage media as recited in claim 11, wherein the removing comprises removing the one entries entry if the encrypted key cache is already full and a new entries entry is to be saved in the encrypted key cache.

14. A method comprising:
   receiving a request, from a user, to access an encrypted file;
   accessing an encrypted key cache in encrypted form from a memory configured to store the encrypted key cache, the encrypted key cache corresponding to the user and containing multiple entries, each entry corresponding to the user and one or more of multiple encrypted files, each entry having an unencrypted symmetric key used to encrypt the one or more multiple encrypted files that correspond to the unencrypted symmetric key's entry;
   decrypting the encrypted key cache using a private key of a public/private key pair, the public/private key pair corresponding to the user; and identifying at least one entry of the multiple entries of the encrypted key cache having an unencrypted symmetric key that was used to encrypt the requested encrypted file.

15. One or more non-transitory computer storage media as recited in claim 1, wherein each plurality of access control entries for each user corresponds to a separate type of access to the file.

16. One or more non-transitory computer storage media as recited in claim 1, wherein a hash of the file is used to generate the symmetric key for the file.

17. A method as recited in claim 14 further comprising, in response to a failure to identify at least one entry, decrypting an encrypted symmetric key that corresponds to the encrypted file, the decrypting includes using the private key.

18. A method as recited in claim 17, further comprising storing, in the encrypted key cache, a mapping of the access control entry corresponding to the other file to the decrypted symmetric key.

19. A method as recited in claim 14, further comprising:
removing an entry from the encrypted key cache while leaving one or more other entries in the encrypted key cache.

20. A method comprising:
accessing a key cache from a memory configured to store the key cache, wherein the key cache maintains a plurality of access control entry to symmetric key mappings corresponding to a plurality of files accessible to a user in a distributed file system, wherein each of the plurality of mappings identifies a symmetric key used to decrypt a file corresponding to the mapping;

generating an encrypted file that includes the key cache and that is encrypted using a symmetric key associated with the key cache;

encrypting the symmetric key associated with the key cache using a public key of a public/private key pair, the public/private key pair corresponding to the user;

storing the encrypted symmetric key associated with the key cache in an access control entry corresponding to the encrypted file; and storing both the encrypted file and the access control entry corresponding to the encrypted file in the distributed file system.

\* \* \* \* \*